United States Patent [19]

Komp

[11] Patent Number: 4,638,878
[45] Date of Patent: Jan. 27, 1987

[54] DEVICE FOR THE CUSHIONED MOUNTING OF A TRACTOR CAB

[75] Inventor: Hermann-Josef Komp, Bad Münstereifel Im Kronenberg, Fed. Rep. of Germany

[73] Assignee: Kloeckner-Humboldt-Deutz AG, Cologne, Fed. Rep. of Germany

[21] Appl. No.: 783,103

[22] Filed: Oct. 2, 1985

[30] Foreign Application Priority Data

Oct. 3, 1984 [DE] Fed. Rep. of Germany ....... 3436169

[51] Int. Cl.[4] ............................................. B62D 33/06
[52] U.S. Cl. .................................. 180/89.13; 296/190
[58] Field of Search .......................... 180/89.12, 89.13; 296/35.1, 190

[56] References Cited

U.S. PATENT DOCUMENTS

| | | | |
|---|---|---|---|
| 3,288,237 | 11/1966 | Muller | 180/89.13 |
| 4,330,149 | 5/1982 | Salmon | 296/190 |
| 4,451,079 | 5/1984 | Takahashi | 180/89.13 |

FOREIGN PATENT DOCUMENTS

| | | | |
|---|---|---|---|
| 3000606 | 7/1981 | Fed. Rep. of Germany ... | 180/89.12 |
| 18527 | 2/1979 | Japan ............................... | 180/89.13 |

*Primary Examiner*—David M. Mitchell
*Assistant Examiner*—Kenneth R. Rice
*Attorney, Agent, or Firm*—Watson, Cole, Grindle & Watson

[57] ABSTRACT

A device for cushioned support of a driver's cab (1) on the chassis (2) of a tractor. The device includes a transversal swinging arm (10) mounted on the chassis in the rear area of the cab (1), the transversal arm pivots around a lateral axis and, at its front end, acts through a ball joint (23) on the cab (1) at or near its center of gravity (S). The device also includes mounting points (3, 4 and 5) in the form of damping spring elements (6,7). With such a device, the cab is secured against rotation about the vertical axis and is also buffered against excessive pitching motion.

8 Claims, 3 Drawing Figures

DEVICE FOR THE CUSHIONED MOUNTING OF A TRACTOR CAB

The present invention relates to a device for the cushioned mounting of a cab on the self-supporting chassis of a tractor. More specifically, the device provides three cushioning mounting points, at least one of which is designed to provide long-stroke cushioning, and one approximately triangular transversal swinging arm which is mounted on the chassis diagonally to the vehicle's longitudinal axis and which acts on the cab through a ball joint located at its free end.

A device known through EP-PS 0 019 498 provides for the cushioned mounting of a vehicl's cab using three cushioning mounting points. Two of these mountings are simple rubber mountings which support the cab in the rear area on both sides. The front of the cab is mounted over a ball joint on a long-stroke spring element which extends alongside a triangular transversal swinging arm. The triangular transversal swinging arm is hinged on the chassis beneath the cab, approximately in the center, through a diagonally running axle around which it pivots. The cab is also supported in the front, on the sides of the ball joint, by a torsion bar mounted on both sides of the chassis diagonally to the longitudinal direction of the vehicle. In this known device, however, only limited spring travel of the rear part of the cab is possible through the two rear rubber mountings, so that primarily only a cushioning of the pitching motion of the cab is achieved about the rear mounting points. A particular disadvantage of this device is that large vertical impacts and vibration impulses on the cab, which in the example given are especially introduced through the rear axle, cannot be sufficiently reduced.

It is therefore an object of the present invention to provide a device for a tractor cab which allows sufficient freedom of movement of the entire cab, particularly in the vertical direction, and, at the same time, in the pitching and rolling direction to reduce vibratory stresses for the driver under all operational conditions.

These objects are achieved by one embodiment of the present invention which has the following characteristics:

(a) A ball joint acts upon the cab at or close to the center of gravity of the cab;

(b) The cab is protected against rotation around vertical axis by a flexible support; and (c) Cushioning mounting points between the cab and the chassis are damping spring elements (shock absorbing legs).

Such a device assures in a simple manner that the cab always has sufficient freedom of movement for cushioning of shocks in the lifting, pitching and rolling direction and that all other degrees of freedom are arrested so that undesirable movements of the cab, which could affect driving safety, are prevented. The placement of the ball joint at or near the center of gravity also has the effect, for instance, that during initial acceleration and while braking on a slope, there is little or no tilting of the cab in relation to the lateral and longitudinal axes.

These objects are also achieved by another embodiment of the invention which has the following characteristics:

(a) A ball joint acts upon the cab at or near the center of gravity of the cab;

(b) A cushioning mounting point is constructed as a damping spring element; and (c) Two cushioning mounting points are located in a transverse direction on opposite sides on the cab and are part of a joint torsion bar.

A device having the above characteristics secures the cab against rotation about its vertical axis in addition by a support. It has also been found advantageous to locate the transversal swinging arm on the chassis near the rear area of the cab.

In certain special situations, it may be appropriate to mount the transversal swinging arm on the chassis so that it is flexibly rotatable around its axis of rotation. To obtain optimum insulation against structural sounds between the chassis and the cab, it is advantageous to form the flexible rotation mounting of the transversal swinging arm as a rubber-metal element.

Finally, it is also appropriate in stabilizing the movements of the cab if, between the chassis and the cab, a damping element is located on the cab at a point removed from the ball joint, the damping element reacting to pitching movements of the cab.

Two embodiments of the invention are described in more detail below in conjunction with the drawings in which.

Figure 1:
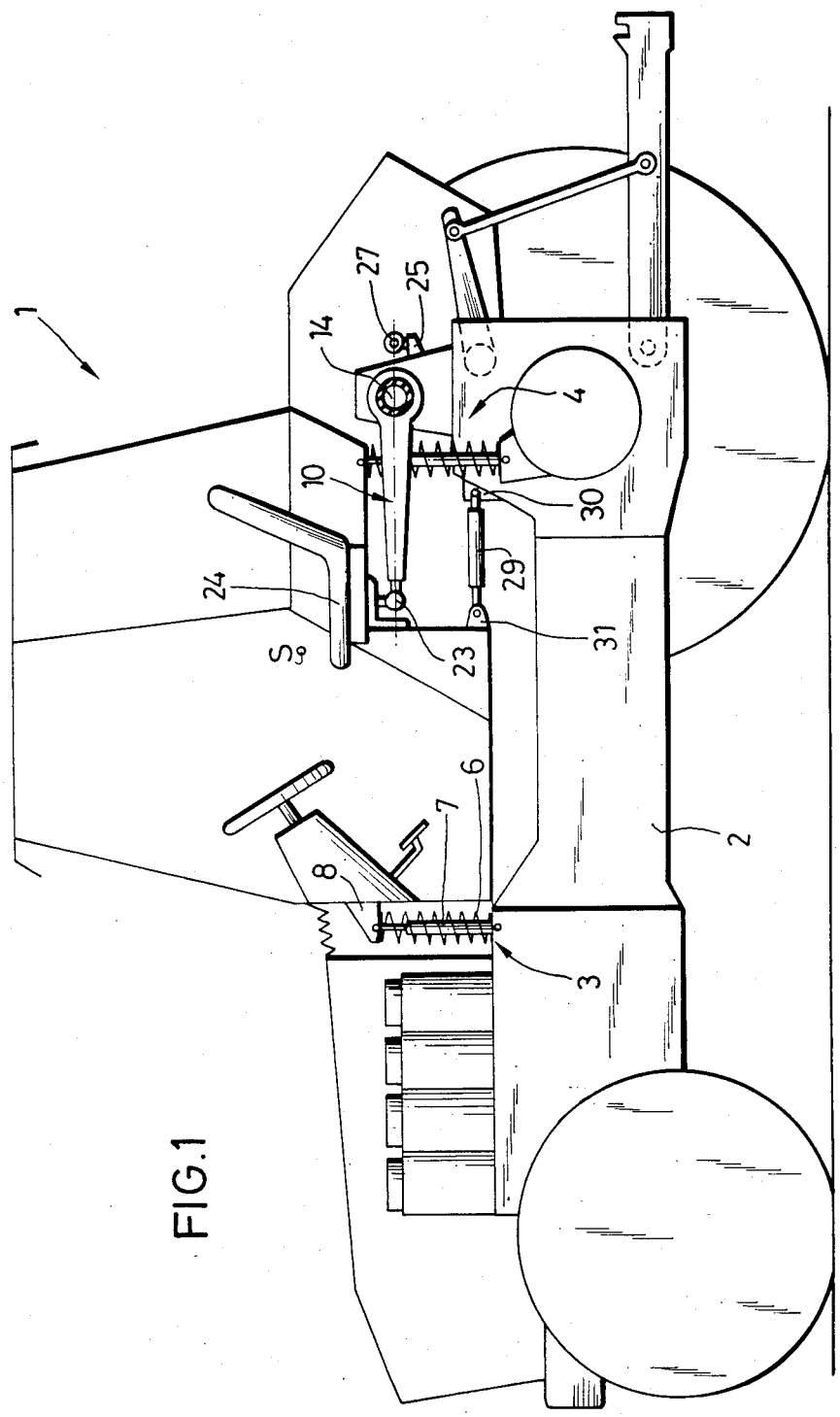
FIG. 1 is an elevational schematic view, partially in cross-section, of a cushioned cab mounting means in accordance with the invention.
Figure 2:
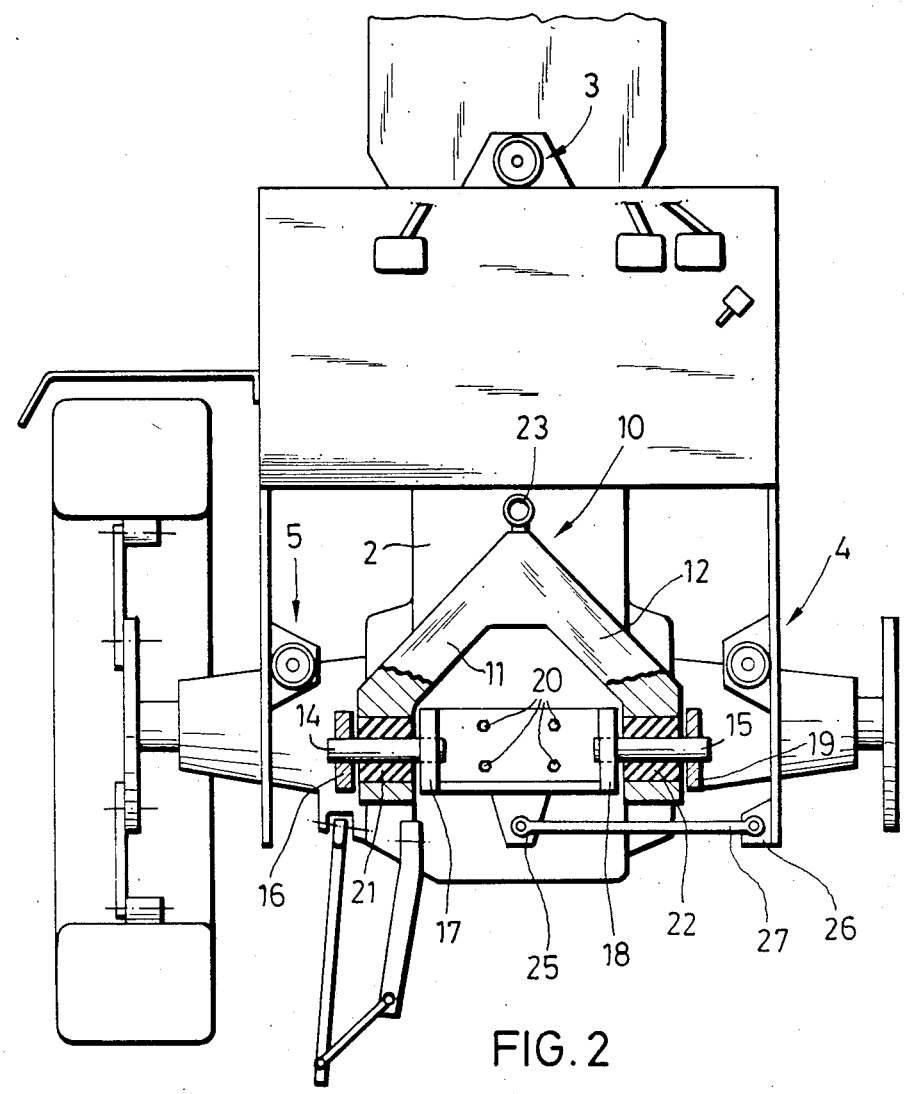
FIG. 2 is a top schematic view of the cab mounting means in accordance with FIG. 1.

FIG. 1 shows a tractor with a self-supporting driver's cab 1 which is flexibly suspended on a self-supporting chassis 2. Three damping spring elements 3, 4 and 5 (shock absorbing legs) are provided as cushioning support units, each of which comprises spiral spring 6 with centrally placed shock absorber 7. One of the damping spring elements 3 is located in the forward area of cab 1 between supporting bracket 8 which is connected to the cab and chassis 2. Two other damping spring elements 4 and 5 support the rear area of the driver's cab 1 and hinge, as shown in FIG. 2, on both sides near the side walls to support bearings on the floor of the driver's cab 1.

On chassis 2 and beneath the rear area of driver's cab 1 is triangularly-shaped transversal swinging arm 10 which is mounted horizontally and which pivots about an axis which extends transverse to the longitudinal axis of the tractor. Transversal swinging arm 10, corresponding to its triangular shape, has two arms 11 and 12 extending to the rear and which run parallel to each other at their ends. Each end of arms 11 and 12 is flexibly hinged to pivot joint 14 and 15 in bearings 16,17 and 18,19, respectively. Screws 20 fasten the bearings 16-19 to chassis 2 of the tractor. In the area where transversal swinging arm 10 is mounted, rubber elements 21 and 22 are inserted between arms 11 and 12 and the corresponding pivots 14,15, the rubber elements being connected with the arms as well as the corresponding pivot joints 14,15, to form flexibly rotating metal-rubber elements. The two pivot joints 14 and 15 engage either the, rotating or rigid, bearings 16,17 or 18,19. When the pivots become engaged in the rigid mode, then a flexible support of the transversal swinging arm 10 toward the tractor body 2 is created through the metal-rubber elements 21,22. At the tip of the transversal swinging arm 10 is a part of the ball joint 23, the other part of the ball joint acting upon the cab 1 near its center of gravity S.

The center of gravity S of the cab 1 lies approximately above the forward edge of the driver's seat 24. To link the ball joint 23 as close as possible to the center of gravity S of the cab 1, driver's seat 24 has none of the usual vertical cushioning devices. The arrangement of the ball joint 23 near the center of gravity S of the cab 1 provides great stability for the cab against pitching and rolling.

To avoid rotational movements of the cab 1 about the vertical axis, a rod 27 with ball joints on each end is linked between a rigid supporting bracket 25 on the tractor chassis 2 and a supporting bracket 26 attached on the side of the cab 1. In addition, in accordance with FIG. 1, a vibration damper 29 is located below the transversal swinging arm 10. One side of the vibration damper 29 is hinged to a supporting bracket 30 on the tractor chassis 2 and the other side, separated from the ball joint 23, is hinged to a fixed supporting bracket 31 which projects from driver's cab 1. By means of the vibration damper 29, pitching movements of the cab 1, which may be particularly intense while starting and braking the vehicle, are largely prevented.

Figure 3:
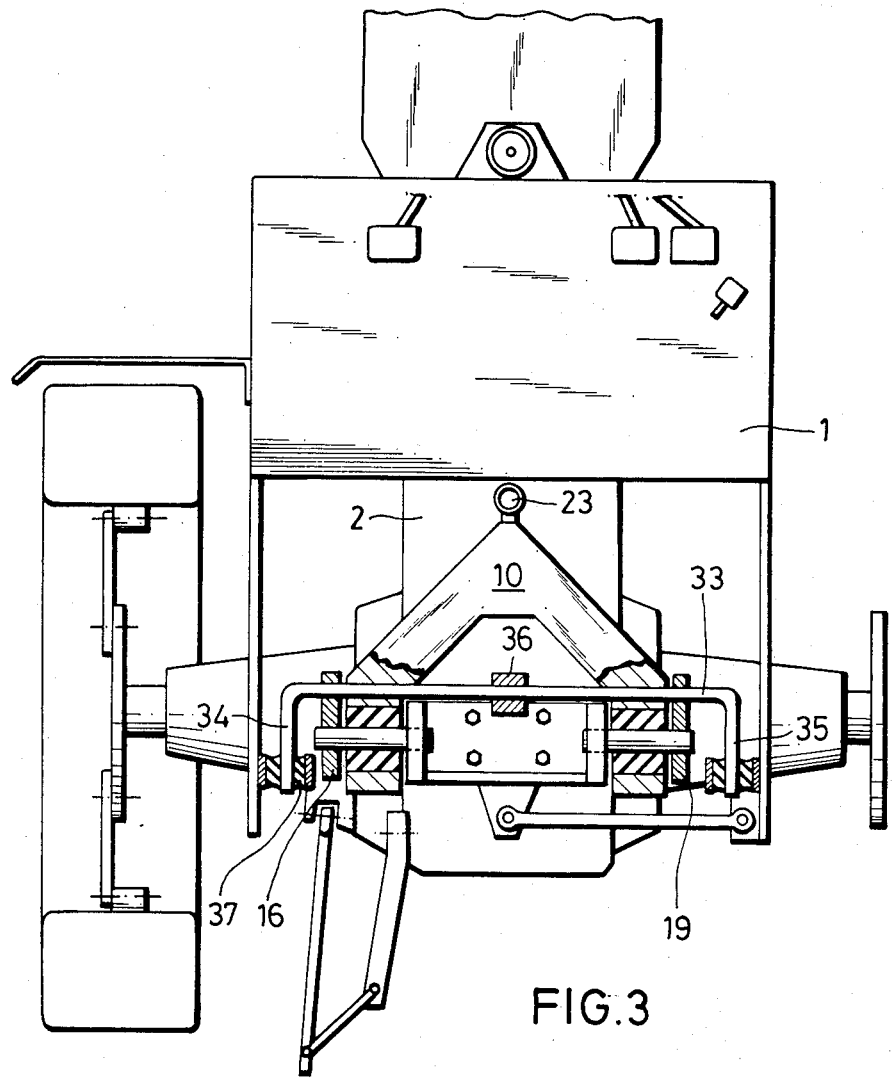
FIG. 3 is a top schematic view of another embodiment of a cushioned mounting means according to the invention.

The device as shown in FIG. 3 has, instead of the spiral springs 6 on the rear damping spring elements 4 and 5 in the previous embodiment, a torsion bar 33 which extends across the entire width of the cab 1. The torsion bar 33 is mounted in the forward extension of the bearing parts 16 and 19 of the two pivots 14 and 15 so it can rotate and is also rigidly suspended in the center on a fixed mount 36 on the tractor chassis 2. The ends 34 and 35 of the torsion bar 33 extend toward the rear and sit as cushioning mounting points 37 at the floor of the cabin or something similar. Additional damping elements may also be needed when such a torsion bar is used, but are not shown here.

I claim:

1. A vehicle comprising a chassis and a cab having a front and a rear mounted thereon, three spring action cushioning mounting points between the cab and the chassis, at least one point being of the long stroke type, one mounting point being near the front of the cab and the other two near the rear and opposed to each other on a line transverse to the longitudinal axis of the chassis, an approximately triangular transversal swinging arm pivotally attached at one end to two points on an axle secured to the chassis, the axle located near the rear of the cab and extending transverse to the longitudinal axis of the chassis, the swinging arm attached to the cab at the other end by a ball joint located near the center of gravity of the cab.

2. A vehicle in accordance with claim 1 further including a support extending between the cab and the chassis to secure the cab from rotating about its vertical axis.

3. A vehicle in accordance with claim 1, wherein the transversal swinging arm is mounted to the axle for flexible rotation.

4. A vehicle in accordance with claim 3, wherein the transversal swinging arm is flexibly mounted to the axle by metal-rubber elements.

5. A vehicle in accordance with claim 1, further including a damping element attached to the cab and the chassis which reacts to pitching movements of the cab.

6. A vehicle in accordance with claim 1, further including a damping element attached to the cab and the chassis which reacts to pitching movements of the cab.

7. A device in accordance with claim 1, wherein the two mounting points near the rear are parts of a common torsion-rod spring.

8. A device in accordance with claim 1, wherein the spring action cushioning mounting points include a shock absorber.

* * * * *